United States Patent
Kato et al.

(10) Patent No.: US 7,342,086 B2
(45) Date of Patent: Mar. 11, 2008

(54) ALIPHATIC POLYESTER POLYETHER COPOLYMER, PROCESS FOR PRODUCING THE SAME AND ALIPHATIC POLYESTER COMPOSITION USING THE COPOLYMER

(75) Inventors: Satoshi Kato, Kanagawa (JP); Rie Shirahama, Kanagawa (JP); Atsushi Kusuno, Kanagawa (JP); Kazunori Yano, Mie (JP); Yuuko Motegi, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/026,154

(22) Filed: Jan. 3, 2005

(65) Prior Publication Data

US 2005/0192412 A1    Sep. 1, 2005

Related U.S. Application Data

(63) Continuation of application No. PCT/JP03/08232, filed on Jun. 27, 2003.

(30) Foreign Application Priority Data

Jul. 3, 2002 (JP) .......................... P.2002-195089
Jul. 3, 2002 (JP) .......................... P.2002-195090

(51) Int. Cl.
  *C08F 6/00* (2006.01)
(52) U.S. Cl. .................. 528/480; 524/783; 525/437; 525/444; 528/283; 528/296; 528/301; 528/302; 528/355; 528/361
(58) Field of Classification Search ............... 528/283, 528/296, 301, 302, 355, 361; 525/437, 444; 524/783
See application file for complete search history.

(56) References Cited

U.S. PATENT DOCUMENTS 5,278,275 A * 1/1994 Yatsuka et al. ............... 528/74
5,593,778 A * 1/1997 Kondo et al. ............... 428/373
6,297,347 B1 10/2001 Warzelhan et al.

FOREIGN PATENT DOCUMENTS

| EP | 0 765 913 | 4/1997 |
|---|---|---|
| EP | 1 227 130 | 7/2002 |
| JP | 7-330954 | 12/1995 |
| JP | 08-059808 | * 3/1996 |
| JP | 8-59808 | 3/1996 |
| JP | 8-295727 | 11/1996 |
| JP | 9-272732 | 10/1997 |
| JP | 9-272789 | 10/1997 |
| JP | 9-290019 | 11/1997 |
| JP | 10-120889 | 5/1998 |
| JP | 11-152326 | 6/1999 |
| JP | 2002-47402 | 2/2002 |
| WO | 02/06400 | 1/2002 |
| WO | 02/28969 | 4/2002 |

OTHER PUBLICATIONS

Yan Liu et al. New Biodegradable Polymers from Renewable Sources—Segmented Copolyesters of Poly(1,3-Propanediol Succinate) and Poly(Ethylene Glycol) ;Journal of Bioactive and Compatible Polymers, vol. 17, No. 3, 209-219 (2002) Abstract Only.*
Database WPI, Section Ch., Week 199933, Derwent Publications Ltd., London, GB; Class A 23, AN—1999-389430, XP-002358025.
Database WPI, Section Ch., Week 199704, Derwent Publications Ltd., London, GB; Class A23, AN—1997-0388040, XP-002358026.
Database WPI, Section Ch., Week 199608, Derwent Publications Ltd., London, GB; Class A23, AN—1996-075028, XP-002358027.
Database WPI, Section Ch., Week 199804, Derwent Publications Ltd., London, GB; Class A96, AN—1998-036145, XP-002358028.
Database WPI, Section Ch., Week 199804, Derwent Publications Ltd., London, GB; Class A23, AN—1998-035822, XP-002358029.
Database WPI, Section Ch., Week 199829, Derwent Publications Ltd., London, GB; Class A23, AN—1998-328611, XP-002358031.
Database WPI, Section Ch., Week 200249, Derwent Publications Ltd., London, GB; Class A23, AN—2002-456846, XP-002358032.

* cited by examiner

*Primary Examiner*—Terressa Boykin
(74) *Attorney, Agent, or Firm*—Oblon, Spivak, McClelland, Maier & Neustadt, P.C.

(57) ABSTRACT

An aliphatic polyester polyether copolymer is provided having an aliphatic polyester moiety comprising 35 to 50 molar % of an aliphatic diol unit, 35 to 50 molar % of an aliphatic dicarboxylic acid unit and 0 to 30 molar % of an aliphatic oxycarboxylic acid unit and a polyether moiety, wherein $\eta_{sp}/C$ is not less than 1.40 and the ratio by weight of the polyether moiety to the aliphatic polyester polyether copolymer is 0.1 to 90% by weight.

29 Claims, No Drawings

ALIPHATIC POLYESTER POLYETHER COPOLYMER, PROCESS FOR PRODUCING THE SAME AND ALIPHATIC POLYESTER COMPOSITION USING THE COPOLYMER

CROSS REFERENCES TO RELATED APPLICATIONS

This application is a continuation of International Patent Application No. PCT/JP03/08232, filed on Jun. 27, 2003, and claims priority to Japanese Patent Application No. 2002-195089, filed on Jul. 3, 2003, and Japanese Patent Application No. 2002-195090, filed on Jul. 3, 2003.

FIELD OF THE INVENTION

The present invention relates to a macromolecular aliphatic polyester polyether copolymer, to a process for producing the same and to an aliphatic polyester composition using the copolymer. More particularly, it relates to an aliphatic polyester polyether copolymer having a practically sufficient high molecular weight and an excellent mechanical property, to a process for producing the same and to an aliphatic polyester composition using the copolymer.

BACKGROUND ART

With regard to biodegradable macromolecular substances, various resins such as polylactic acid, polybutylene succinate, polyethylene succinate, polycaprolactone and polyhydroxybutyrate have been proposed already.

Those biodegradable macromolecular substances have a characteristic that they have a biodegradable property but, as compared with resins such as polyolefin, aromatic polyester resin and engineering plastic, there is a problem that their physical property, particularly mechanical strength, is not so sufficiently good for practical use. In order to solve such a problem, resin where a biodegradable polyester resin is copolymerized with polyether such as polyethylene glycol has been proposed (refer to Patent Document 1).

In the copolymer proposed therein however, no sufficient molecular weight is available and its mechanical physical property is not sufficient for practical use. Therefore, polymers having a biodegradable property and a sufficient mechanical physical property have been demanded.

In the meanwhile, a method where two or more aliphatic polyesters are blended so as to improve the mechanical property has been attempted as well. For example, polybutylene succinate has a sufficient elongation but, in some uses, strength such as elasticity is somewhat low and is too soft while, although polylactic acid has a high rigidity, it lacks in elongation and has a hard and fragile property whereby its use is limited. Therefore, compositions where they are subjected to a melt blending have been proposed (refer to Patent Document 2).

However, although the compositions disclosed as such are compositions which are suitable for the formation of film and the like, they are insufficient in terms of physical property for the field of use as injection molded products where higher impact strength and rigidity are demanded or, to be more specific, interior parts for automobiles, home appliance parts and baskets whereby there has been a demand for a composition having both higher impact strength and rigidity.

[Patent Document 1]
JP-A-8-59808

[Patent Document 2]
JP-A-9-272789

An object of the present invention is to provide an aliphatic polyester polyether copolymer having a biodegradable property and a sufficient mechanical physical property, a process for producing the same and an aliphatic polyester composition having both higher impact strength and rigidity.

DISCLOSURE OF THE INVENTION

The first gist of the present invention relates, as shown in claim 1, to an aliphatic polyester polyether copolymer having an aliphatic polyester moiety comprising 35 to 50 molar % of an aliphatic diol unit, 35 to 50 molar % of an aliphatic dicarboxylic acid unit and 0 to 30 molar % of an aliphatic oxycarboxylic acid unit and a polyether moiety having the following formula (I), wherein $\eta_{sp}/C$ is not less than 1.40 and the ratio by weight of the polyether moiety to the aliphatic polyester polyether copolymer is 0.1 to 90% by weight.

(In the formula, R is hydrogen or an alkyl group; m is an integer of 1 to 10; and n is an integer of 4 to 1,000.)

The second gist of the present invention relates to a process for the production of an aliphatic polyester polyether copolymer by a polycondensation reaction of an aliphatic diol, an aliphatic dicarboxylic acid or a derivative aliphatic oxycarboxylic acid and a polyether represented by the following formula (2) in the presence of a catalyst, characterized in that, the aliphatic oxycarboxylic acid is compounded in an amount of 0.1 to 100 part(s) by weight to 100 parts by weight of the aliphatic dicarboxylic acid.

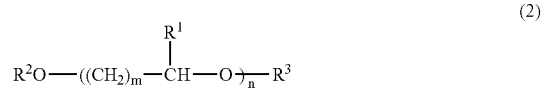

(In the formula (2), $R^1$ is hydrogen or an alkyl group; $R^2$ and $R^3$ each independently is hydrogen or an organic group where at least one of $R^2$ and $R^3$ is hydrogen; m is an integer of 1 to 10; and n is an integer of 4 to 1,000.)

The third gist of the present invention is an aliphatic polyester composition, characterized in that, (A) the aliphatic polyester polyether copolymer mentioned in claim 1, (B) an aliphatic polyester of a number-average molecular weight of 10,000 to 300,000 comprising an aliphatic diol unit, an aliphatic dicarboxylic acid unit and an aliphatic oxycarboxylic acid unit and (C) polylactic acid having a number-average molecular weight of not less than 30,000 are melted and blended.

BEST MODE FOR CARRYING OUT THE INVENTION

The present invention will now be illustrated in detail as hereunder.

(1) An aliphatic polyester polyether copolymer
<Aliphatic diol unit>
The aliphatic diol component which is an aliphatic diol unit constituting the aliphatic polyester polyether copolymer of the present invention is an aliphatic and alicyclic compound having two hydroxyl groups and its preferred specific example is represented by the following formula (3).

$$HO-R^4-OH \tag{3}$$

In the formula, $R^4$ is a divalent aliphatic hydrocarbon group and its carbon numbers are usually not less than 2 for the lower limit and are usually not more than 11 or, preferably, not more than 6 for the upper limit. $R^4$ includes a cycloalkylene group which may have a branched chain. Preferred $R^4$ is $-(CH_2)_p-$ where p is an integer which is usually not less than 2 for the lower limit and usually not more than 11 or, preferably, not more than 6 for the upper limit.

There is no particular limitation for the aliphatic diol which is able to be used for the present invention and its specific examples are ethylene glycol, 1,3-propanediol, 1,4-butanediol, 1,5-pentanediol, 1,6-hexanediol, 1,4-cyclohexanediol and 1,4-cyclohexanedimethanol.

Among those, 1,4-butanediol and ethylene glycol are preferred in view of physical property of the resulting copolymer and 1,4-butanediol is particularly preferred. Each of them may be used solely or two or more thereof may be used as a mixture.

In the total constituting components which constitute the copolymer, amount of the aliphatic diol unit is not less than 35 molar % or, preferably, not less than 45 molar % for the lower limit and is not more than 50 molar % or, preferably, not more than 49.95 molar % for the upper limit.

<Aliphatic dicarboxylic acid unit>

The aliphatic dicarboxylic acid component comprising the aliphatic dicarboxylic acid unit is an aliphatic dicarboxylic acid and derivative thereof and is a dicarboxylic acid represented by the following formula (4), a lower alkyl ester having 1 to 4 carbon(s) thereof, an anhydride thereof, etc.

$$HOOC-R^5-COOH \tag{4}$$

In the formula, $R^5$ is a direct bond or a divalent aliphatic hydrocarbon group where its carbon number is usually not less than 2 for the lower limit and is not more than 11 or, preferably, not more than 6 for the upper limit. $R^5$ includes a cycloalkylene group or may have a branched chain. Preferred $R^5$ is $-(CH_2)_q-$ in which q is an integer of not less than 0 for the lower limit and not more than 11 or, preferably, not more than 6 for the upper limit.

Preferred specific examples of the aliphatic dicarboxylic acid and-derivatives thereof are oxalic acid, succinic acid, glutaric acid, adipic acid, sebacic acid, suberic acid and dodecane-dicarboxylic acid.

Among those, succinic acid, adipic acid, sebacic acid and dedecane-dicarboxylic acid are preferred, succinic acid and adipic acid are more preferred and succinic acid is particularly preferred in view of physical property of the resulting copolymer. Each of them may be used solely or two or more thereof may be used as a mixture.

In the total constituting components which constitute the copolymer, amount of the aliphatic dicarboxylic acid unit is not less than 35 molar % or, preferably, not less than 45 molar % for the lower limit and is not more than 50 molar % or, preferably, not more than 49.95 molar % for the upper limit.

<Aliphatic oxycarboxylic acid unit>

With regard to the aliphatic oxycarboxylic acid component comprising the aliphatic oxycarboxylic acid unit, although there is no particular limitation so far as it is a compound having one hydroxyl group and one carboxylic acid group in a molecule, an aliphatic oxycarboxylic acid of the following formula (5), $C_1$-$_4$ lower alkyl ester thereof and intramolecular ester thereof are suitable.

$$HO-R^6-COOH \tag{5}$$

In the formula, $R^6$ is a divalent aliphatic hydrocarbon group. It has one or more carbon(s) and its upper limit is usually not more than 11 or, preferably, not more than 6. Although $R^6$ may include a cycloalkylene group, it is preferably a chain hydrocarbon. The term "chain" shall include a branched chain.

More preferred one is an α-hydroxycarboxylic acid where one carbon atom has hydroxyl group and carboxyl group and particularly preferred one is that which is represented by the formula (6) in view of polymerization activity.

$$HO-\underset{\underset{C_aH_{2a+1}}{|}}{CH}-COOH \tag{6}$$

In the formula, a is an integer of 0 or 1 or more, preferably, 0 or 1 to 10 or, more preferably, 0 or 1 to 5.

Specific examples of the aliphatic carboxylic acid are lactic acid, glycolic acid, 3-hydroxybutyric acid, 4-hydroxybutyric acid, 2-hydroxy-3-methyl-n-butyric acid, 2-hydroxy-3,3-dimethylbutyric acid, 2-hydroxy-3-methylbutyric acid, 2-methylbutyric acid, 1-hydroxycaproic acid and 2-hydroxyisocaproic acid, a compound where ring of a lactone such as caprolacton is open and a mixture thereof. When there are optical isomers. therefor, any of D-, L- and racemic substances may be used and, with regard to its form, it may be solid, liquid or aqueous solution.

Among them, lactic acid and/or glycolic acid where an increase in polymerization speed is significant and availability is easy are/is particularly preferred and lactic acid is most preferred. With regard to the form thereof, aqueous solutions of 30 to 95% are preferred since they are easily available.

In the total constituting components which constitute the copolymer, amount of the aliphatic oxycarboxylic acid is not less than 0 molar % or, preferably, not less than 0.1 molar % for the lower limit and not more than 30 molar % or, preferably, not more than 10 molar % for the upper limit.

In view of ability for achieving a high molecular weight, it is preferred that the aliphatic polyester polyether copolymer of the present invention contains an aliphatic oxycarboxylic acid. Also in view of the effect that crystallinity of the resulting aliphatic polyester polyether copolymer lowers and in view of the miscibility upon blending with polylactic acid, it is still preferred that the aliphatic oxycarboxylic acid is contained.

<Monomer unit having at least three hydroxyl groups and/or carboxyl groups>

When the polyester polyether copolymer of the present invention further contains a monomer unit having at least three hydroxyl groups and/or carboxyl groups, it is preferred in terms of the reaction in such a respect that formation of a high molecular weight is apt to be achieved and that time for the polymerization reaction is able to be shortened. That is also preferred in terms of physical property in such a respect that melt tension increases and molding such as a blow molding is able to be easily conducted. Specific examples of the component therefor are malic acid, citric acid, 1,2,3-propanetriol, trimethylolpropane, pentaerythritol, glycerol, tartaric acid and 1,2,4-butanetriol. Among them, malic acid and citric acid are preferred since they are apt to give a high molecular weight.

The amount thereof in the total constituting components which constitute the copolymer is not less than 0 molar % or, preferably, not less than 0.001 molar % for the lower limit and usually not more than 5 molar % or, preferably, not more than 1 molar % for the upper limit.

<Polyether moiety>

The polyether moiety of the present invention is represented by the above formula (1) and, in the formula, specific examples of R are hydrogen and an alkyl group having 1 to 5 carbon(s) such as methyl group, ethyl group, n-propyl group, isopropyl group, n-butyl group and isobutyl group. Among them, hydrogen and methyl group are preferred and the most preferred one is hydrogen.

In the formula, m is an integer where the lower limit is not less than 1 while the upper limit is usually not more than 10, preferably not more than 6, more preferably not more than 4, still more preferably not more than 3 and, most preferably, 2. In the formula, n is an integer where the lower limit is usually not less than 4, preferably not less than 10 and, more preferably, not less than 20 while the upper limit is usually not more than 1,000, preferably not more than 500, more preferably not more than 200 and, most preferably, not more than 50.

With regard to the polyether component constituting the polyether moiety, the polyether of the above-mentioned formula (2) is listed. In the formula (2), specific examples and preferred examples of $R^1$ are the same as those for R in the formula (1). $R^2$ and $R^3$ each independently is hydrogen or an organic group and at least one of them is hydrogen. Examples of the organic group are alkyl group, glycidyl group, epoxy group and acyl group. Preferred $R^2$ and $R^3$ are hydrogen, methyl group, ethyl group and glycidyl group and, in view of reactivity and easy availability, hydrogen and methyl group are most preferred. Each of them may be used either solely or two or more thereof may be used as a mixture. Preferred ranges of m and n in the formula (2) are the same as those in the formula (1).

Preferred polyether moiety is selected from polyethylene glycol, polypropylene glycol, poly 1,3-propanediol and polytetramethylene glycol and two or more thereof may be used jointly. Among them, polytetramethylene glycol and poly 1,3-propanediol are particularly preferred and poly 1,3-propanediol is most preferred.

The ratio by weight of the polyether moiety in the aliphatic polyester polyether copolymer is not less than 0.1% by weight, preferably not less than 1% by weight or, more preferably, not less than 5% by weight for the lower limit while it is not more than 90% by weight, preferably not more than 70% by weight, more preferably not more than 50% by weight or, most preferably, not more than 30% by weight for the upper limit. When the ratio by weight of the polyether moiety to the aliphatic polyester polyether copolymer is too small, an effect of improving the mechanical property is small while, when it is too large, there is a tendency that heat resistant lowers and molding property lowers.

<Process for the production of an aliphatic polyester polyether copolymer>

Known fusion polycondensation, solution copolymerization, etc. are able to be adopted for the process for producing the aliphatic polyester polyether copolymer of the present invention. In the present invention, it is preferred to adopt a melt polycondensation where no solvent is used for reducing the cost since a step for removal of the catalyst after the polymerization is able to be omitted.

Amount of the aliphatic diol used in the polycondensation is substantially equimolar to 100 mol of the aliphatic dicarboxylic acid but, since there is distillation in general during the esterification, an excessive amount to an extent of 1 to 20 molar % is usually used.

When the aliphatic oxycarboxylic acid is added, it is added in an amount of usually not less than 0.1 part by weight, preferably not less than 1.0 part by weight or, more preferably, not less than 2.0 parts by weight for the lower limit and not more than 100 parts by weight, preferably not more than 50 parts by weight or, more preferably, not more than 20 parts by weight for the upper limit to 100 parts by weight of the aliphatic dicarboxylic acid and a polycondensation is carried out.

When the amount is too small, no effect by addition is achieved while, when it is too much, crystallinity is lost, molding ability lowers and there is a tendency that heat resistance and mechanical characteristic are insufficient.

When the aliphatic oxycarboxylic acid is added, there is no particular limitation for timing and method for addition of the aliphatic oxycarboxylic acid when the addition is conducted prior to the polycondensation reaction and examples thereof are (1) a method where a catalyst is in a state of being previously dissolved in an aliphatic oxycarboxylic acid solution is added and (2) a method where it is added together with addition of the catalyst in a stage of charging the materials.

Timing for the introduction of the polyether component may be any of charging together with another monomer in the initial stage of polymerization and before initiation of the vacuation but charging together with another monomer is preferred in view of simplification of the steps.

Polymerization temperature in the production of the aliphatic polyester polyether copolymer of the present invention is recommended to be selected from the range which is usually not lower than 150° C. or, preferably, not lower than 180° C. for the lower limit and is usually not higher than 260° C. or, preferably, not higher than 230° C. for the upper limit. Time for the polymerization is usually not shorter than 2 hours or, preferably, not shorter than 4 hours for the lower limit and is usually not longer than 15 hours for the upper limit. Degree of vacuation is usually not more than $1.33 \times 10^3$ Pa of, preferably, not more than $0.27 \times 10^3$ Pa.

With regard to the composition ratio of the aliphatic polyester polyether copolymer of the present invention, it is necessary that the molar ratio of the total amount of hydroxyl group of the aliphatic diol and terminal hydroxyl group of the polyether terminal to the amount of carboxyl group of the aliphatic dicarboxylic acid is substantially equal.

The aliphatic polyester polyether copolymer of the present invention is produced in the presence of a polymerization catalyst. Examples of the catalyst are titanium compounds, antimony compounds, tin compounds and zinc compounds and, among them, germanium compounds are preferred. There is no particular limitation for the germanium compounds and examples thereof are germanium oxide, organic germanium compounds such as tetraalkoxy germanium and inorganic germanium compounds such as germanium chloride. In view of cost and easy availability, germanium oxide, tetraethoxy germanium and tetrabutoxy germanium are preferred and germanium oxide is particularly preferred. Joint use with other catalysts is also acceptable if that does not deteriorate the object of the present invention.

Amount of the catalyst used is usually not less than 10 ppm, preferably not less than 20 ppm or, more preferably, not less than 50 ppm for the lower limit and is usually not more than 30,000 ppm, preferably, not more than 1,000 ppm or, more preferably, not more than 500 ppm for the upper limit.

There is no particular limitation for the timing of addition of the catalyst provided that it is prior to the polycondensation and the catalyst may be added when the materials are charged or may be added upon initiation of vacuation. A method where the catalyst is added together with aliphatic oxycarboxylic acid such as lactic acid and/or glycolic acid upon charging the materials or a method wherein the catalyst is added by dissolving in an aqueous solution of the aliphatic oxycarboxylic acid is preferred. A method where the catalyst is added by dissolving in an aqueous solution of the aliphatic oxycarboxylic acid is particularly preferred because polymerization speed becomes high.

<Aliphatic polyester polyether copolymer>

Molar % of each component of the aliphatic polyester moiety in the present invention is able to be determined by measurement of the aliphatic polyester polyether copolymer by $^1$H-NMR. Ratio by weight of the polyether moiety to the aliphatic polyester polyether copolymer is able to be determined by such a manner that weight of the polyether is determined from molar fraction of the polyether moiety and then its ratio by weight in the copolymer is calculated.

Reducing viscosity $\eta_{sp}/C$ of the aliphatic polyester polyether copolymer of the present invention is not less than 1.4, preferably not less than 1.5 and, more preferably, not less than 1.8. The upper limit is usually not more than 4.0, preferably not more than 3.5 and, more preferably, not more than 3.2.

The aliphatic polyester polyether copolymer of the present invention contains substantially no aromatic compound such as an aromatic dicarboxylic acid and the amount of the aromatic compound in the aliphatic polyester polyether copolymer of the present invention is usually not more than 5 molar %, preferably not more than 3 molar %, more preferably not more than 1 molar % and, most preferably, entirely nil.

When an aromatic compound is present in the structure, biodegradability lowers and, in addition, the aromatic compound remains in the residue after biodegradation whereby there is a case of inconvenience in terms of preservation of the environment.

Breaking extension upon a tensile test for a sample which is prepared by molding of the aliphatic polyester polyether copolymer of the present invention is preferably not less than 400%, more preferably not less than 600%, still more preferably, not less than 900% and, most preferably, not less than 1,000% and its upper limit is usually not more than 3,000%.

Strength at breaking point in a tensile test is preferably not less than 15 MPa, more preferably not less than 20 MPa and, still more preferably, not less than 30 MPa and its upper limit is usually not more than 60 MPa.

Each peak temperature of loss modulus G" and tan δ in a dynamic viscoelasticity test of the sample prepared by molding of the aliphatic polyester polyether copolymer of the present invention is preferably not higher than −30° C. and, more preferably, no-higher than −40° C. When peak temperatures of G" and tan δ are within a practically used temperature or a preservation temperature, physical property tends to change during the use or during the preservation.

When amount of soft segments such as polyether is too much, peak temperatures of G" and tan δ lower and, since lowering of crystallinity, lowering of crystallizing speed, lowering of heat resistance, etc. are noted, the preferred lower limit is −60° C. or, more preferably, −50° C.

Storage modulus (G') at the measuring temperature range of −50 to 60° C. is usually not less than $1 \times 10^5$ Pa, preferably $1 \times 10^6$ Pa or, more preferably, not less than $1 \times 10^7$ Pa for the lower limit and, for the upper limit, it is usually not more than $1 \times 10^{10}$ Pa.

Loss modulus (G") at the measuring temperature range of −50 to 60° C. is usually not less than $1 \times 10^4$ Pa, preferably $1 \times 10^5$ Pa or, more preferably, not less than $1 \times 10^6$ Pa for the lower limit and, for the upper limit, it is usually not more than $1 \times 10^8$ Pa.

When changes in storage modulus G' and loss modulus G" at the measuring temperature range of −50 to 60° C. are big, mechanical physical property lowers as a result of changes in temperature and, therefore, changes in the highest and the lowest values within the measuring temperature range are preferably to be small. When storage modulus G' and loss modulus G" are too small, changes to stress is big and there are some cases where mechanical physical property and maintenance of the shape are inferior. When storage modulus G' and loss modulus G" are too large, the product is usually fragile and shock resistance tends to lower.

In the aliphatic polyester polyether of the present invention, concentration of consumption acid in a biodegradation test of an aerobic closed type is usually not more than 6-fold or, preferably, not more than 3-fold of that with polybutylene succinate. In the present invention, the biodegradation test of an aerobic closed type means a method where, in a biodegradation test according to JIS K6950, amount of a sample plastic to be added is changed to 500 mg/l instead of 100 mg/l. The polubutylene succinate used here has a composition of succinic acid/1,4-butanediol/hexamethylene diisocyanate=49.5/49.5/1 where a number-average molecular weight is 34,000 and a weight-average molecular weight is 217,000.

The aliphatic polyester polyether copolymer of the present invention is able to be utilized for molded products such as film, laminate film, sheet, plate, elongated sheet, monofilament, multifilament, nonwoven fabric, flat yarn, staple fiber, crimp fiber, striped tape, split yarn, compounded fiber, blow bottle and foamed product by commonly used plastic molding methods such as injection molding, hollow molding and extrusion molding. At that time, agent for crystal nucleus, antioxidant, lubricant, coloring agent, releasing agent, filler, other polymer, etc. may be added thereto if necessary.

The aliphatic polyester polyether copolymer of the present invention has biodegradability, has a characteristic of being completely degraded by bacteria in the soil and is a very useful polymer in view of environmental hygiene. Therefore, it is able to be used for various uses such as shopping bag, garbage bag, film for agricultural use, synthetic paper, container for cosmetics, container for detergents, container for bleaching agents, fishing line, fishnet, rope, binding material, surgical string, cover stock material for hygiene, cooling box and cushion material.

(2) Aliphatic polyester composition

The aliphatic polyester composition of the present invention which is a subject of the present invention is a product prepared by a melt blending of the above-mentioned (A) aliphatic polyester polyether copolymer with (B) an aliphatic polyester of a number-average molecular weight of 10,000 to 300,000 comprising an aliphatic diol unit, an aliphatic dicarboxylic acid unit and an aliphatic oxycarboxylic acid unit and (C) polylactic acid of a number-average molecular weight of not less than 30,000.

<(B) Aliphatic polyester>

The aliphatic polyester (B) is able to be manufactured by polycondensation of aliphatic oxycarboxylic acid component, aliphatic dicarboxylic acid component and aliphatic diol component in the above-mentioned aliphatic polyester polyether copolymer in the presence of a catalyst.

Amount of the aliphatic oxycarboxylic acid is usually not less than 0.04 mol, preferably not less than 1 mol or, more preferably, not less than 3 mol for the lower limit and is usually not more than 60 mol, preferably not more than 20 mol or, more preferably, not more than 10 mol for the upper limit to 100 mol of the aliphatic dicarboxylic acid or a derivative thereof. When the aliphatic oxycarboxylic acid is too little, an effect for improving the polymerization reaction is hardly achieved and macromolecular polyester is hardly prepared while, when it is too much, heat resistance and strength may become insufficient.

Other copolymerizing component may be introduced into the aliphatic polyester (B) used for the present invention so far as the effect is not deteriorated thereby. When tri- or more functional hydroxypolycarboxylic acid, polycarboxylic acid, polyhydric alcohol or the like is added as other copolymerizing component, the fusion viscosity is able to be enhanced and that is preferred. Specific examples thereof are malic acid, trimethylolpropane, glycerol, pentaerythritol and trimellitic acid. In view of physical property of the resulting polyester, malic acid, trimethylolpropane and glycerol are particularly preferred.

Amount of other copolymerizing component as such is usually not less than 0 molar % or, preferably, not less than 0.01 molar % for the lower limit and usually not more than 5 molar % or, preferably, not more than 1 molar % for the upper limit in the total constituting units which constitute the aliphatic polyester (B).

With regard to conditions such as polymerization temperature, time, pressure, catalyst, etc., the same conditions as those for the above-mentioned aliphatic polyester polyether copolymer may be applied.

The aliphatic polyester (B) which is a subject of the present invention is a polyester where an aliphatic diol component and an aliphatic dicarboxylic acid component are main components. Generally, molar ratio of the aliphatic diol unit to the aliphatic dicarboxylic acid unit is substantially same and, when molar numbers of the total constituting components of the aliphatic polyester (B) are 100, it is preferred that the aliphatic oxycarboxylic acid unit is 0.02 to 30 mol. Especially when the aliphatic oxycarboxylic acid component is lactic acid, miscibility with polylactic acid (C) is enhanced and that is much preferred.

In the aliphatic polyester (B) of the present invention, number-average molecular weight Mn is usually not less than 10,000 or, preferably, it is not less than 30,000 for the lower limit while, for the upper limit, it is usually not more than 300,000.

<(C) Polylactic acid>

Although there is no particular limitation for the polylactic acid (C) used in the present invention, number-average molecular weight for achieving a sufficient strength is not less than 30,000 or, preferably, not less than 100,000. With regard to the molar ratio of an L-substance to a D-substance constituting the polylactic acid, all compositions from 100/0 to 0/100 may be used and, in view of physical property of the resulting polylactic acid, that which has a high elasticity is preferred and it is preferred that an L-substance is not less than 95%. There is no particular limitation for the process for the production of polylactic acid and its examples are a ring-opening polymerization via a lactide and a direct polycondensation of lactic acid.

<Process for the production of aliphatic polyester composition>

With regard to the mixing ratio of each of the components comprising the aliphatic polyester composition of the present invention, it is preferred that the aliphatic polyester polyether copolymer (A) is 1 to 50 part(s) by weight to 100 part(s) by weight in total comprising 1 to 99 part(s) by weight of the aliphatic polyester (B) and 99 to 1 part(s) by weight of polylactic acid (C).

In enhancing the strength of the aliphatic polyester composition, the mixing ratio in compounding the aliphatic polyester (B) to polylactic acid (C) is that the lower limit of the aliphatic polyester (B) is made preferably not less than 60 parts by weight or, more preferably, not less than 70 parts by weight while the upper limit of polylactic acid (C) is made preferably not more than 40 parts by weight or, more preferably, not more than 30 parts by weight. In a composition prepared by such a mixing ratio, not only strength is endowed by the aliphatic polyester (B) but also, unexpectedly, elongation is endowed.

When elongation is endowed where the high rigidity of the polylactic acid (C) is still maintained, the mixing ratio in compounding the aliphatic polyester (B) to polylactic acid (C) is that the upper limit of the aliphatic polyester (B) is made preferably not more than 40 parts by weight or, more preferably, not more than 30 parts by weight while the lower limit of polylactic acid (C) is made preferably not less than 60 parts by weight or, more preferably, not less than 70 parts by weight.

When impact strength of the aliphatic polyester composition is improved, the compounding amount of the aiphatic polyester polyether copolymer (A) to 100 parts by weight in total of the aliphatic polyester (B) and polylactic acid (C) is made preferably not less than 10 parts by weight or, more preferably, not less than 20 parts by weight for the lower limit and, for the upper limit, it is made preferably not more than 40 parts by weight. When the amount is too much, although impact strength is improved, there may be the case where rigidity lowers. With regard to the method for a fusion blending, known kneading art may be adopted and that may be conducted in a fused state of each of the above-mentioned components.

In addition, in the aliphatic polyester composition of the present invention, it is also possible, if necessary, to use lubricant, wax, coloring agent, filler, stabilizer, etc. together therewith in subjecting to a practical use within such an extent that the advantage of the present invention is not deteriorated.

EXAMPLES

As hereunder, the present invention will now be more specifically illustrated by way of the Examples and the present invention is not limited to those Examples so far as being outside the gist thereof.

(1) Reduced viscosity ($\eta_{sp}/C$): It was determined from viscosity at 30° C. of a solution of a copolymer prepared in Examples and Comparative Examples in phenol/tetrachloroethane (1:1 ratio by weight) in a concentration of C=0.5 g/dl.

(2) Molar % of the copolymer and ratio by weight of the polyether: Molar fraction of each component in the resulting copolymer was measured by $^1$H-NMR. Further, weight of the polyether was determined from molar fraction of the polyether moiety and ratio by weight in the copolymer was calculated therefrom. In the measurement of $^1$H-NMR, JEOL EX 270 (a product name; manufactured by Nippon Denshi) was used.

(3) Tensile test: The copolymer prepared in Examples and Comparative Examples was subjected to a heat press at 150° C. whereupon film of 100 μm was prepared. A sample was punched from this film in a shape of a dumbbell and a tensile test was conducted at tensile speed of 200 mm/minute where distance between two marks was 10 cm and distance between chucks was 60 mm.

(4) Dynamic viscoelasticity test: The copolymer prepared in Examples and Comparative Examples was subjected to a heat press at 200° C. whereupon a sheet of 2 mm was prepared. A test piece of 12 mm width was punched from this sheet and a viscoelasticity test was conducted. RMS 800 (product name; manufactured by Rheometric Scientific FE) was used as a measuring device and measurement was conducted after keeping for 60 seconds at the measuring temperature where distance between the chucks was 45 mm and the measurement frequency was 1 Hz in which the applied strain was within a linear range.

(5) Number-average molecular weight (Mn) and weight-average molecular weight (Mw): Measurement was conducted by a gel permeation chromatography (GPC). A sample was dissolved in chloroform and measurement was conducted using a GPC device (manufactured by Tosoh; product name: type HLC-8020) on the basis of polystyrene. PLgel-10 μ-MIX was used as a column.

(6) Impact strength test and rigidity test: From the composition of Examples and Comparative Examples, injection molded product was molded using a table injection molding device (manufactured by CST; product name: Minimax Molding Device) where the molding temperature was 200° C. and the metal mold temperature was 80° C. Impact strength and rigidity of the molded product were measured in accordance with JIS K 7110 and 6911.

Example 1

Into a reactor equipped with stirrer, nitrogen inlet, heating device, thermometer and vacuating outlet were charged 106.3 g of succinic acid, 87.6 g of 1,4-butanediol, 17.65 g of polyethylene glycol (PEG) where number-average molecular weight was 1,000 and 5.46 g of 90% aqueous solution of lactic acid in which 1% by weight of germanium was previously dissolved as materials. Nitrogen gas was introduced into the content in the container with stirring and the system was made into a nitrogen atmosphere-by means of a vacuum substitution.

After that, the system was heated up to 220° C. with stirring and the reaction was carried out at that temperature for 1 hour. Then, temperature was raised up to 230° C. during 30 minutes, vacuation was conducted during 1 hour and 30 minutes at the same time until 0.07×10³ Pa and the reaction was carried out at 0.07×10³ Pa for 4.5 hours to finish the polymerization whereupon an aliphatic polyester polyether copolymer in white color was prepared (hereinafter, referred to as "copolymer") Reduced viscosity ($\eta_{sp}/c$) of the resulting copolymer was 2.05. Molar % of the aliphatic polyester moiety in the copolymer was 49.2 molar % for a succinic acid unit, 49.0 molar % for a 1,4-butanediol unit and 1.8 molar for a lacticacid unit. Ratio by weight of polyether moiety was 9.6% by weight.

Strand of the resulting copolymer was very tough. As a result of a tensile test of the film having a thickness of 100 μm, the breaking elongation was 410% and the strength at breaking point was 27 MPa. When a biodegradation test of an aerobic closed type was conducted using 150 mg of the sample, consumed oxygen amount during 28 days was 230 mg and degradation rate was 100%.

Example 2

Reaction was carried out by the same method as in Example 1 except that 94.5 g of succinic acid, 76.1 g of 1,4-butanediol, 35.31 g of PEG having a number-average molecular weight of 1,000 and 4.85 g of a 90% aqueous solution of lactic acid in which 1% by weight of germanium oxide was previously dissolved were used in Example 1 and the polymerization was finished by conducting the reaction at 0.07×10³ Pa for 4.5 hours to give a white copolymer. Reduced viscosity ($\eta_{sp}/c$) of the resulting copolymer was 2.18. Molar % of the aliphatic polyester moiety in the copolymer was 49.5 molar % for a succinic acid unit, 48.5 molar % for a 1,4-butanediol unit and 2.0 molar for a lactic acid unit. Ratio by weight of polyether moiety was 19.3% by weight.

Strand of the resulting copolymer was very tough. As a result of a tensile test of the film having a thickness of 100 μm, the breaking elongation was 650% and the strength at breaking point was 38 MPa. When a biodegradation test of an aerobic closed type was conducted using 150 mg of the sample, consumed oxygen amount during 28 days was 165 mg and degradation rate was 75%.

Example 3

Reaction was carried out by the same method as in Example 1 except that PEG having a number-average molecular weight of 1,000 was changed to 17.65 g of polypropylene glycol (PPG) having a number-average molecular weight of 1,000 in Example 1 and the polymerization was finished by conducting the reaction at 0.07×10³ Pa-for 6.5 hours to give a white copolymer. Reduced viscosity ($\eta_{sp}/c$) of the resulting copolymer was 1.85. Molar % of the aliphatic polyester moiety in the copolymer was 49.4 molar % for a succinic acid unit, 48.8 molar % for a 1,4-butanediol unit and 1.8 molar for a lactic acid unit. Ratio by weight of polyether moiety was 9.1% by weight.

Strand of the resulting copolymer was very tough. As a result of a tensile test of the film having a thickness of 100 μm, the breaking elongation was 500% and the strength at breaking point was 34 MPa.

Example 4

Synthesis of poly 1,3-propanediol (P 1,3 PD)

Into a reactor equipped with stirrer, nitrogen inlet, heating device, thermometer and vacuating outlet was charged 152.6 g of 1,3-propanediol as a material. Nitrogen gas was introduced into the content in the container with stirring and the system was made into a nitrogen atmosphere by means of a vacuum substitution. After that, 1.52 g of concentrated sulfuric acid was added, the system was heated up to 130° C. with stirring and the reaction was carried out at that temperature for 30 minutes. Then, temperature was raised up to 180° C. during 15 minutes. At that time, the system was in a dark brown color and dehydrated amount of about 20 g. After that, vacuation was conducted during 1 hour until 0.07×10³ Pa and the reaction was carried out at 0.07×10³ Pa for 4.5 hours to finish the polymerization. Temperature of the system was cooled down to room temperature, 100 ml of deionized water was added, the mixture was stirred and the reaction system was washed with water. The upper layer which was an aqueous layer was taken out and washing with water was repeated until pH became 5 to 6. After that, 10 g of calcium hydroxide was added to the polymer layer to neutralize, drying was conducted at 100° C. in vacuo and, when it was still hot, filtration was conducted using Celite. The resulting P 1,3 PD was a viscous liquid in light yellow color and was in an amount of 33 g (yield: 28%) and its number-average molecular weight by $^1$H-NMR was 1050.

Copolymerization of P 1,3 PD

Reaction was carried out by the same method as in Example 1 except that PEG having a number-average molecular weight of 1,000 was changed to 17.65 g of the above-synthesized P 1,3 PD having a number-average molecular weight of 1,050 in Example 1 and the reaction was carried out at $0.07 \times 10^3$ Pa for 4.7 hours to finish the polymerization whereupon a white copolymer was prepared. Reduced viscosity ($\eta_{sp}/c$) of the resulting copolymer was 1.83. Molar % of the aliphatic polyester moiety in the copolymer was 49.0 molar % for a succinic acid unit, 48.8 molar % for a 1,4-butanediol unit and 2.2 molar for a lactic acid unit. Ratio by weight of polyether moiety was 9.6% by weight.

Strand of the resulting copolymer was very tough. As a result of a tensile test of the film having a thickness of 100 μm, the breaking elongation was 500% and the strength at breaking point was 34 MPa. When a biodegradation test of an aerobic closed type was conducted using 150 mg of the sample, consumed oxygen amount during 28 days was 5 mg and degradation rate was 2%.

Example 5

Reaction was carried out by the same method as in Example 1 except that PEG having a number-average molecular weight of 2,000 was changed to 17.65 g of polytetramethylene glycol (PTMG) having a number-average molecular weight of 2,000 in Example 1 and the reaction was carried out at $0.07 \times 10^3$ Pa for 6 hours to finish the polymerization whereupon a white copolymer was prepared. Reduced viscosity ($\eta_{sp}/c$) of the resulting copolymer was 1.88. Molar % of the aliphatic polyester moiety in the copolymer was 49.4 molar % for a succinic acid unit, 48.8 molar % for a 1,4-butanediol unit and 1.8 molar for a lactic acid unit. Ratio by weight of polyether moiety was 9.6% by weight.

Strand of the resulting copolymer was very tough. As a result of a tensile test of the film having a thickness of 100 μm, the breaking elongation was 520% and the strength at breaking point was 40 MPa. When a biodegradation test of an aerobic closed type was conducted using 150 mg of the sample, consumed oxygen amount during 28 days was 44 mg and degradation rate was 20%.

Example 6

Reaction was carried out by the same method as in Example 1 except that PEG having a number-average molecular weight of 1,000 was changed to 35.2 g of PTMG having a number-average molecular weight of 2,000 in Example 2 and the reaction was carried out at $0.07 \times 10^3$ Pa for 6 hours to finish the polymerization whereupon a white copolymer was prepared. Reduced viscosity ($\eta_{sp}/c$) of the resulting copolymer was 1.91. Strand of the resulting copolymer was very tough. Molar % of the aliphatic polyester moiety in the copolymer was 49.4 molar % for a succinic acid unit, 48.8 molar % for a 1,4-butanediol unit and 1.8 molar for a lactic acid unit. Ratio by weight of polyether moiety was 20.0% by weight. Result of a tensile test and a dynamic viscoelasticity of the resulting copolymer are shown in Table 1.

Example 7

Reaction was carried out by the same method as in Example 1 except that 59.1 g of succinic acid, 45.5 g of 1,4-butanediol, 88.0 g of PTMG having a number-average molecular weight of 2,000 and 3.63 g of 90% aqueous solution of lactic acid in which 2% by weight of germanium oxide was previously dissolved were used in Example 1 and the reaction was carried out at $0.07 \times 10^3$ Pa for 4.5 hours to finish the polymerization whereupon a white semi-transparent copolymer was prepared. Reduced viscosity ($\eta_{sp}/c$) of the resulting copolymer was 2.34. Molar % of the aliphatic polyester moiety in the copolymer was 49.0 molar % for a succinic acid unit, 48.7 molar % for a 1,4-butanediol unit and 2.3 molar for a lactic acid unit. Ratio by weight of polyether moiety was 49.1% by weight.

Strand of the resulting copolymer was very tough and also shows rubber elasticity. Result of a tensile test and a dynamic viscoelasticity test of the resulting copolymer are shown in Table 1. When a biodegradation test of an aerobic closed type was conducted using 150 mg of the sample, consumed oxygen amount during 28 days was 30 mg and degradation rate was 10%.

Example 8

Reaction was carried out by the same method as in Example 1 except that 35.3 g of succinic acid, 2.40 g of 1,4-butanediol, 123.2 g of PTMG having a number-average molecular weight of 2,000 and 1.91 g of 90% aqueous solution of lactic acid in which 2% by weight of germanium oxide was previously dissolved were used in Example 1 and the reaction was carried out at $0.07 \times 10^3$ Pa for 5 hours to finish the polymerization whereupon a white semi-transparent copolymer was prepared. Reduced viscosity ($\eta_{sp}/c$) of the resulting copolymer was 3.04. Molar % of the aliphatic polyester moiety in the copolymer was 49.0 molar % for a succinic acid unit, 48.5 molar % for a 1,4-butanediol unit and 2.5 molar for a lactic acid unit. Ratio by weight of polyether moiety was 69.0% by weight.

Strand of the resulting copolymer was very tough and also shows rubber elasticity. Result of a tensile test and a dynamic viscoelasticity test of the resulting copolymer are shown in Table 1.

Example 9

Reaction was carried out by the same method as in Example 5 except that 87.6 g of 1,4-butanediol was changed to 83.6 g and, instead of 90% aqueous solution of malic acid in which 1% by weight of germanium oxide was dissolved, 0.39 g of 27.7% by weight aqueous solution of lactic acid in which 4% by weight of germanium oxide was previously dissolved in Example 5 and the reaction was carried out at $0.07 \times 10^3$ Pa for 5 hours to finish the polymerization whereupon a white semi-transparent copolymer was prepared. Reduced viscosity ($\eta_{sp}/c$) of the resulting copolymer was 1.89. Molar % of the aliphatic polyester moiety in the copolymer was 49.1 molar % for a succinic acid unit, 48.4 molar % for a 1,4-butanediol unit and 0.32 molar for a malic-acid unit. Ratio by weight of polyether moiety was 9.6% by weight.

Strand of the resulting copolymer was very tough and also shows rubber elasticity. As a result of a tensile test of the resulting copolymer, elongation was 510 and ultimate breakage was 38 MPa. When a biodegradation test of an aerobic closed type was conducted using 150 mg of the sample, consumed oxygen amount during 28 days was 42 mg and degradation rate was 19%.

Comparative Example 1

Into a reactor equipped with stirrer, nitrogen inlet, heating device, thermometer and vacuating outlet were charged 118.1 g of succinic acid and 99.1 g of 1,4-butanediol and the system was made a nitrogen atmosphere by means of nitrogen-vacuation substitution. Then the system was raised up to 220° C. with stirring and stirring was conducted at that temperature for 1 hour. After that, temperature was raised up to 230° C. during 30 minutes and, at the same time, vacuation was conducted so as to make $0.07 \times 10^3$ Pa during 1 hour and 30 minutes. Reaction was carried out at $0.01 \times 10^3$ Pa for 4 hours to finish the reaction whereupon a white polyester was prepared. Reduced viscosity ($\eta_{sp}/C$) of the resulting polyester (polybutylene succinate lactate) was 1.97. Molar % of each component is 48.8 molar % for a succinic acid unit, 48.8 molar % for a 1,4-butanediol unit and 2.4 molar % of a lactic acid unit. Result of tensile test and dynamic viscoelasticity test of the resulting polyester is shown in Table 1.

As a result of a biodegradation test of an aerobic and closed type using 150 mg of a sample, consumed oxygen amount during 28 days was 20 mg and degradation rate was 10%.

Comparative Example 2

As a result of a biodegradation test of an aerobic and closed type using 150 mg of polybutylene succinate (a sample having a composition of succinic acid/1,4-butanediol/hexamethylene diisocyanate=49.5/49.5/1, a number-average molecular weight of 34,000 and weight-average molecular weight of 217,000), consumed oxygen amount during 28 days was 15 mg and degradation rate was 7%.

Preparation Example 1: (A) Aliphatic polyester polyether copolymer

Into a reactor equipped with stirrer, nitrogen inlet, heating device, thermometer and vacuating outlet were charged 94.5 g of succinic acid, 76.1 g of 1,4-butanediol, 35.2 g of polytetramethylene glycol (PTMG) wherein number-average molecular weight was 2,000 and 4.85 g of 90% aqueous solution of lactic acid in which 1% by weight of germanium was previously dissolved as materials. Nitrogen gas was introduced into the content in the container with stirring and the system was made into a nitrogen atmosphere by means of a vacuum substitution. After that, the system was heated up to 220° C. with stirring and the reaction was carried out at that temperature for 1 hour. Then, temperature was raised up to 230° C. during 30 minutes, vacuation was conducted during 1 hour and 30 minutes at the same time until $0.07 \times 10^3$ Pa and the reaction was carried out at $0.07 \times 10^3$ Pa for 4.5 hours to finish the polymerization whereupon a white and semi-transparent aliphatic polyester polyether copolymer was prepared (hereinafter, referred to as "copolymer"). Reduced viscosity ($\eta_{sp}/c$) of the resulting copolymer was 1.91. Molar % of the aliphatic polyester moiety in the copolymer was 49.4 molar % for a succinic acid unit, 48.8 molar % for a 1,4-butanediol unit and 1.8 molar for a lactic acid unit. Ratio by weight of polyether moiety to the copolymer was 20.0% by weight.

Preparation Example 2: (B) Aliphatic polyester

Into a 300-ml reactor equipped with stirrer, nitrogen inlet, heating device, thermometer and excipient inlet were charged 118.1 g of succinic acid (b), 99.1 g of 1,4-butanediol (a), 6.3 g of 90% aqueous solution of lactic acid (d) in which 1% by weight of germanium was previously dissolved (6.3 mol to 100 mol of succinic acid) and 0.2 g of malic acid (c) (0.15 mol to 100 mol of succinic acid), the reaction was carried out at 280° C. for 0.5 hour in a nitrogen atmosphere, temperature was raised to 220 d° C. and the reaction was conducted for 0.5 hour. After that, polymerization reaction was carried out in vacuo at 0.0655 kPa for 2.5 hours. The resulting polyester was in a milky white color and its Mn

TABLE 1

| | PTMG | | | Tensile Test | | Dynamic Viscoelasticity Test | | | | | |
| | Amt (wt %) | Number-average molecular weight | $\eta_{sp}/C$ (dL/g) | Elongation at Break (%) | Strength at Break (MPa) | −50 to −60° C. | | | | −150 to 120° C. | |
| | | | | | | G' (Pa) | | G" (Pa) | | G" Peak | tanδ Peak |
| | | | | | | Max | Min | Max | Min | ° C. | ° C. |
|---|---|---|---|---|---|---|---|---|---|---|---|
| Example 6 | 20 | 2000 | 1.91 | 640 | 45 | $9.75 \times 10^8$ | $8.35 \times 10^7$ | $8.40 \times 10^7$ | $2.39 \times 10^6$ | −41 | −36 |
| Example 7 | 50 | 2000 | 2.34 | 1030 | 21 | $1.85 \times 10^8$ | $2.00 \times 10^7$ | $2.67 \times 10^7$ | $7.63 \times 10^5$ | −71 | −56 |
| Example 8 | 70 | 2000 | 3.04 | 1050 | 15 | $1.46 \times 10^8$ | $4.30 \times 10^6$ | $1.55 \times 10^7$ | $2.75 \times 10^5$ | −75 | −65 |
| Comparative Example 1 | 0 | 2000 | 1.97 | 380 | 40 | $1.75 \times 10^8$ | $1.97 \times 10^6$ | $1.29 \times 10^8$ | $5.00 \times 10^6$ | −28 | −23 | was 75,300. Melting point was 110° C. Rate of introduction of lactic acid to 100 mol of succinic acid as measured by $^1$H-NMR was 6.3 mol.

Examples 10 to 12 and Comparative Examples 3 to 5

The aliphatic polyester polyether copolymer (A) prepared in Preparation Example 1, the aliphatic polyester (B) prepared in Preparation Example 2 and poly L-lactic acid (C) (manufactured by Shimadzu; trade name: Lacti #5400; Mn=88,000) were kneaded using a bravender in the compounding as shown in Table 1 and the resulting compositions were subjected to measurements of impact strength and rigidity by the already-mentioned evaluating methods. The result is shown in Table 2.

TABLE 2

| | Compounding Rate | | Part(s) by Weight | Physical Properties | |
|---|---|---|---|---|---|
| | | | | Izod Impact Strength (KJ/m$^2$) | Rigidity (MPa) |
| Example 10 | (A) | Polyester polyether copolymer | 25 | 14.5 | 2100 |
| | (B) | Aliphatic polyester | 75 | | |
| | (C) | Polylactic acid | 10 | | |
| Example 11 | (A) | Polyester polyether copolymer | 25 | 18.9 | 1890 |
| | (B) | Aliphatic polyester | 75 | | |
| | (C) | Polylactic acid | 20 | | |
| Example 12 | (A) | Polyester polyether copolymer | 25 | 17.9 | 1790 |
| | (B) | Aliphatic polyester | 75 | | |
| | (C) | Polylactic acid | 30 | | |
| Comparative Example 3 | (B) | Aliphatic polyester | 25 | 7.2 | 2500 |
| | (C) | Polylactic acid | 75 | | |
| Comparative Example 4 | (A) | Polyester polyether copolymer | 100 | 14.5 | 500 |
| | (B) | Aliphatic polyester | 10 | | |
| Comparative Example 5 | (A) | Polyester polyether copolymer | 100 | 9.2 | 2250 |
| | (B) | Aliphatic polyester | 20 | | |

The present invention has been illustrated in detail and by referring to its specific embodiments hereinabove and it is apparent for persons skilled in the art that various changes and modifications are able to be applied without deviating from the spirit and the scope of the present invention.

The present invention is based on the Japanese Patent Application filed on Jul. 3, 2002 (Application No. 2002/195,089) and the Japanese Patent Application filed on Jul. 3, 2002 (Application No. 2002/195,090) and their contents are incorporated herein as references.

INDUSTRIAL APPLICABILITY

The aliphatic polyester polyether copolymer of the present invention shows good physical data in a tensile test, has a sufficient mechanical strength and biodegradability and is able to be advantageously used for the use where those physical properties are demanded. According to a process for the production of the present invention, a macromolecular aliphatic polyester polyether copolymer is able to be prepared.

In addition, the aliphatic polyester composition of the present invention has sufficient impact strength and rigidity and is able to be used for various uses. It is particularly suitable for an injection molding method, a hollow molding method, etc. and is particularly preferably able to be utilized for molded products such as interior parts for automobiles, home appliance parts and baskets.

The invention claimed is:

1. An aliphatic polyester polyether copolymer, which comprises:
   an aliphatic polyester moiety, comprising:
      35 to 50 molar % of an aliphatic diol unit,
      35 to 50 molar % of an aliphatic dicarboxylic acid unit, and
      0 to 30 molar % of an aliphatic oxycarboxylic acid unit; and
   poly-1,3-propanediol represented by the following formula:

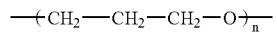

wherein $\eta_{sp}/C$ is not less than 1.40 and the ratio by weight of said poly-1,3-propanediol to the aliphatic polyester polyether copolymer is 0.1 to 90% by weight.

2. The aliphatic polyester polyether copolymer according to claim 1, wherein said aliphatic polyester moiety is an aliphatic polyester comprising 35 to 49.9 molar % of an aliphatic diol unit, 35 to 49.95 molar % of an aliphatic dicarboxylic acid unit and 0.1 to 30 molar % of an aliphatic oxycarboxylic acid unit.

3. The aliphatic polyester polyether copolymer according to claim 1, wherein a monomer unit having at least three hydroxyl groups and/or carboxyl groups is contained within a range of from 0.001 molar % to 5 molar % to the aliphatic dicarboxylic acid unit.

4. The aliphatic polyester polyether copolymer according to claim 1, wherein the aliphatic oxycarboxylic acid unit comprises units of lactic acid and/or glycolic acid.

6. The aliphatic polyester polyether copolymer according to claim 1, wherein the aliphatic dicarboxylic acid unit comprises units of succinic acid and/or adipic acid.

7. The aliphatic polyester polyether copolymer according to claim 1, which exhibits a breaking extension in a tensile test of not less than 400% and strength at breaking point of not less than 15 MPa.

8. The aliphatic polyester polyether copolymer according to claim 1, wherein peak temperature for each of tan δ and loss modulus G" in a dynamic viscoelasticity test is not higher than −30° C.

9. The aliphatic polyester polyether copolymer according to claim 1, which exhibits a storage modulus and a loss modulus G" within a measuring temperature range of −50 to 60° C. in a dynamic viscoelasticity test are from $1\times10^5$ Pa to $1\times10^{10}$ Pa and from $1\times10^4$ Pa to $1\times10^8$ Pa, respectively.

10. The aliphatic polyester polyether copolymer according to claim 1, wherein a consumed oxygen amount in a biodegradability test of an aerobic and closed type is not more than 6-fold of that of polybutylene succinate.

11. A process for producing an aliphatic polyester polyether copolymer, comprising polycondensing an aliphatic diol, an aliphatic dicarboxylic acid or a derivative aliphatic oxycarboxylic acid and poly-1,3-propanediol in the presence of a catalyst,
wherein said aliphatic oxycarboxylic acid is condensed in an amount of 0.1 to 100 part(s) by weight to 100 parts by weight of said aliphatic dicarboxylic acid.

12. The process for producing an aliphatic polyester polyether copolymer according to claim 11, wherein said catalyst comprises a germanium compound.

13. The process for producing an aliphatic polyester polyether copolymer according to claim 12, wherein the amount of said germanium compound used is not more than 500 ppm to the theoretical yield of the resulting copolymer.

14. The process for producing an aliphatic polyester polyether copolymer according to claim 12, wherein germanium oxide is dissolved in an aqueous solution of the aliphatic oxycarboxylic acid and a polycondensation reaction is carried out.

15. An aliphatic polyester composition, which is prepared by a process comprising melting and blending: (A) an aliphatic polyester polyether copolymer according to claim 1; (B) an aliphatic polyester having a number average molecular weight of 10,000 to 300,000 comprising an aliphatic diol unit, an aliphatic dicarboxylic acid unit and an aliphatic oxycarboxylic acid unit; and (C) polylactic acid having a number average molecular weight of not less than 30,000.

16. The polyester composition according to claim 15, wherein the amount of the aliphatic polyester polyether copolymer (A) is 1 to 50 part(s) by weight to 100 parts by weight in total of 1 to 99% by weight of the aliphatic polyester (B) and 99 to 1 part(s) by weight of polylactic acid (C).

17. The polyester composition according to claim 15, wherein said aliphatic polyester polyether copolymer (A) comprises a monomer unit having at least three hydroxyl groups and/or carboxyl groups in an amount within a range of from 0.001 molar % to 5 molar % to said aliphatic dicarboxylic acid unit.

18. The polyester composition according to claim 15, wherein said aliphatic polyester polyether copolymer (A) comprises units of lactic acid and/or glycolic acid.

19. The polyester composition according to claim 15, wherein said aliphatic polyester polyether copolymer (A) comprises units of 1,4-butanediol and/or ethylene glycol.

20. The polyester composition according to claim 15, wherein said aliphatic polyester polyether copolymer (A) comprises units of succinic acid and/or adipic acid.

21. The aliphatic polyester polyether copolymer according to claim 1, wherein said poly-1,3-propanediol contains 4 to 1,000 repeating units.

22. The aliphatic polyester polyether copolymer according to claim 1, wherein said poly-1,3-propanediol contains 10 to 500 repeating units.

23. The aliphatic polyester polyether copolymer according to claim 1, wherein said poly-1,3-propanediol contains 20 to 50 repeating units.

24. The process for producing an aliphatic polyester polyether copolymer according to claim 11, wherein said poly-1,3-propanediol contains 4 to 1,000 repeating units.

25. The process for producing an aliphatic polyester polyether copolymer according to claim 11, wherein said poly-1,3-propanediol contains 10 to 500 repeating units.

26. The process for producing an aliphatic polyester polyether copolymer according to claim 11, wherein said poly-1,3-propanediol contains 20 to 500 repeating units.

27. The polyester composition according to claim 15, wherein said poly-1,3-propanediol contains 4 to 1,000 repeating units.

28. The polyester composition according to claim 15, wherein said poly-1,3-propanediol contains 10 to 500 repeating units.

29. The polyester composition according to claim 15, wherein said poly-1,3-propanediol contains 20 to 500 repeating units.

* * * * *